(No Model.)
J. S. CHASE.
SAFETY CATCH FOR ELEVATORS.
No. 550,867. Patented Dec. 3, 1895.
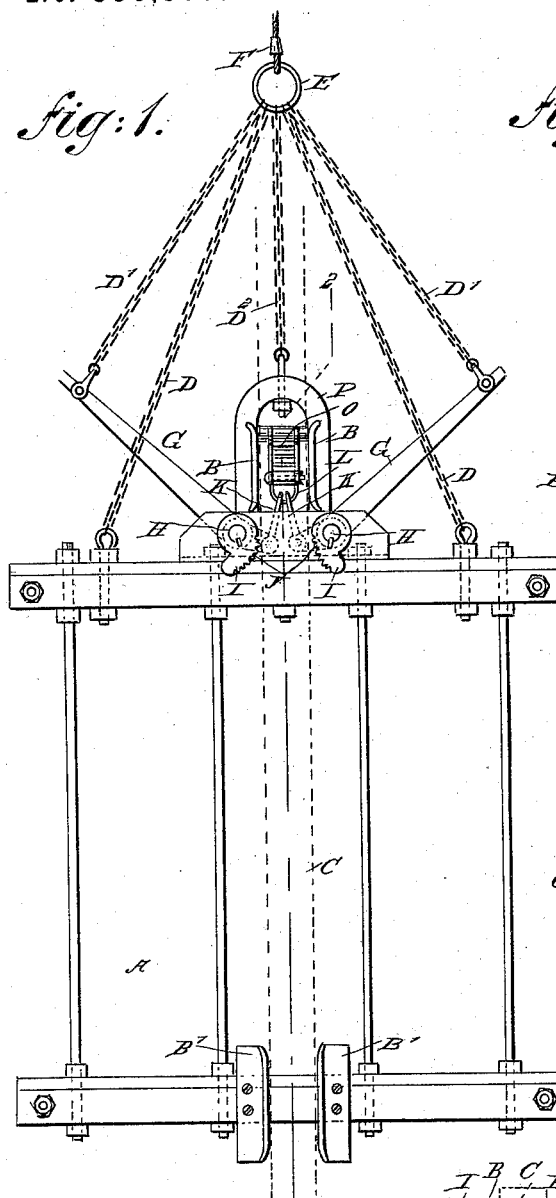
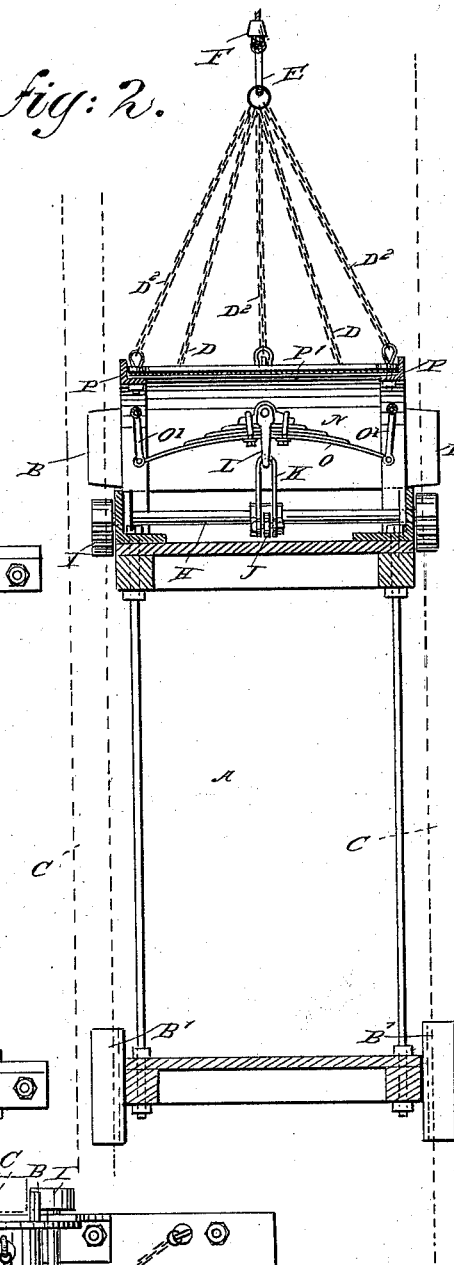
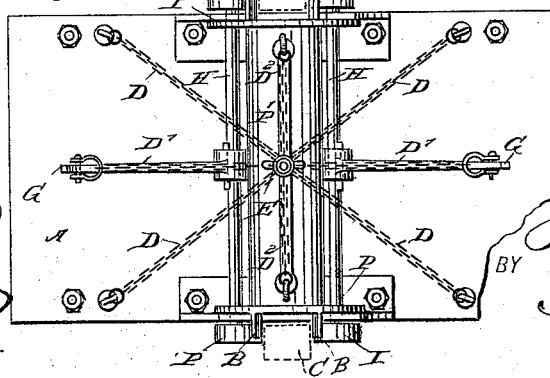
WITNESSES:
INVENTOR
J. S. Chase
BY
Munn & Co
ATTORNEYS.

UNITED STATES PATENT OFFICE.

JOHN S. CHASE, OF LANSING, KANSAS.

SAFETY-CATCH FOR ELEVATORS.

SPECIFICATION forming part of Letters Patent No. 550,867, dated December 3, 1895.

Application filed June 14, 1895. Serial No. 552,792. (No model.)

*To all whom it may concern:*

Be it known that I, JOHN S. CHASE, of Lansing, in the county of Leavenworth and State of Kansas, have invented a new and Improved Safety-Catch for Elevators, of which the following is a full, clear, and exact description.

The object of the invention is to provide a new and improved safety-catch for elevator-cages for freight and passenger service whereby the cage is properly held in position in case of accident to the hoisting device.

The invention consists principally of a cam adapted to engage with its cam-surface the guide-posts for the cage, the said cam being secured on a shaft mounted to turn on the cage, and a spring-pressed arm on the said shaft and connected with a hoisting-cable.

The invention also consists of certain parts and details and combinations of the same, as will be fully described hereinafter, and then pointed out in the claim.

Reference is to be had to the accompanying drawings, forming a part of this specification, in which similar characters of reference indicate corresponding parts in all the figures.

Figure 1 is a side elevation of the improvement. Fig. 2 is a transverse section of the same on the line 2 2 of Fig. 1, and Fig. 3 is a plan view of the same.

The cage A, of any approved construction, is provided with the usual fixed guide-shoes B and B', engaging the guide-posts C, held in the shaft in which the cage is ascending or descending. The top of the cage A is connected by chains D with a ring E, held on the lower end of a hoisting-rope F, and from the said ring E extend downwardly and outwardly the chains D', connected with the free ends of levers G, secured on transversely-extending shafts H, mounted to turn in suitable bearings arranged on the top of the cage A, as is plainly illustrated in the drawings.

On the outer ends of the shafts H are secured cams I, of which the two cams on the front ends of the shafts engage opposite faces of the front guide-post C, and the cams on the rear ends of the said shafts engage the opposite side of the guide-post.

Each of the shafts H is provided at or near its middle with an inwardly-extending arm J, (see Fig. 2,) connected by a link K with a loop L, hung in the middle of a spring O, preferably in the form of an elliptical leaf-spring, as plainly indicated in Fig. 2. The ends of the said spring are attached to links O', hung in irons P, carrying the upper set of guide-shoes B, the said irons also supporting a hood P' to inclose and protect the links O', spring N, loop L, links K, and arms J. Chains $D^2$ are also connected with the upper ends of the irons P and the hood P', the said chains all extending to the ring E.

Now it will be seen that when the several parts are in the position as shown in the drawings, then the weight of the cage suspended from the cable F causes the shafts H to stand in such a position that the roughened surfaces of the cams I are out of engagement with the sides of the guide-post C, and consequently the cage can be readily raised or lowered in the usual manner. In case of an accident, however, to the hoisting device, the strain on the chains D and arm J is released, and consequently the spring N, by pulling on the links K in an upward direction, causes, by the arm J, a turning of the shaft H, so that the cams I are moved with a roughened cam-surface in firm contact with the sides of the guide-post C. The cage is thus locked to the side posts and does not descend in the shaft, as it would do if no such safety-catch were used.

It will be seen that by the arrangement described the cams are thrown almost instantaneously in contact with the guide-post C whenever the rope or cable breaks or becomes slack. The spring N always returns to its normal or compressed state whenever the chains D and D' become taut by the weight of the cage and the load thereon; but the moment the said chains get slack, the spring N acts on cam-shafts as previously explained.

Having thus fully described my invention, I claim as new and desire to secure by Letters Patent—

The combination with the elevator cage, its hoisting cable, and suspension chains connecting the cable with the top of the car, of inverted U-shaped irons on the upper side of the cage, a hood connecting said irons, a leaf spring suspended at its ends within the hood from the upper ends of the said irons, parallel rock shafts mounted in the lower ends or bases of said irons and having cams on their ends at opposite sides of the cage guides, arms projecting inwardly from the middle of said shafts and linked to the middle of said spring, and longer arms projecting outwardly from the middle of the said shafts and chains connecting the outer ends of said arms with the cage cable and holding the rock shafts turned against the action of the leaf spring until the said cable breaks or slackens and then permitting the said spring to rotate the shafts and throw its cams into action, substantially as described.

JOHN S. CHASE.

Witnesses:
W. H. MARKUM,
D. H. MARTIN.